(12) United States Patent
Lee

(10) Patent No.: US 7,019,966 B2
(45) Date of Patent: Mar. 28, 2006

(54) REMOVABLE HARD DISK MODULE

(75) Inventor: Jen-Hsiang Lee, Taipei (TW)

(73) Assignee: Quanta Computer, Inc., Taoyuan Hsien (TW)

( * ) Notice: Subject to any disclaimer, the term of this patent is extended or adjusted under 35 U.S.C. 154(b) by 72 days.

(21) Appl. No.: 10/810,608

(22) Filed: Mar. 29, 2004

(65) Prior Publication Data
US 2005/0013108 A1 Jan. 20, 2005

(30) Foreign Application Priority Data
Jul. 14, 2003 (TW) ................. 92119181 A

(51) Int. Cl.
*G06F 1/16* (2006.01)
(52) U.S. Cl. .................. 361/685; 361/727; 312/223.1; 312/223.2; 248/638
(58) Field of Classification Search ............... 248/638; 312/333, 223.1; 361/683–685, 724–727
See application file for complete search history.

(56) References Cited

U.S. PATENT DOCUMENTS

| | | | |
|---|---|---|---|
| 6,130,817 A * | 10/2000 | Flotho et al. | 361/685 |
| 6,914,778 B1 * | 7/2005 | Deckers et al. | 361/685 |
| 2002/0101713 A1 * | 8/2002 | Eland | 361/686 |
| 2003/0011974 A1 * | 1/2003 | Curlee et al. | 361/683 |

* cited by examiner

*Primary Examiner*—Lisa Lea-Edmonds
*Assistant Examiner*—Anthony Q. Edwards
(74) *Attorney, Agent, or Firm*—Rabin & Berdo, PC

(57) ABSTRACT

A removable hard disk module is described. The removable hard disk module has a module sidewall, a first sliding device, and a second sliding device. The first sliding device and the second sliding device are fixed on the module sidewall and the second sliding device is disposed behind the first sliding device. The first sliding device further has a buffer device and a convex surface for contact with a slim slide. An inner portion of the first sliding device and a rear end of the slim slide further include shock absorption rubbers. The slim slide is configured on a module fixing device and the module fixing device is installed in a server rack.

17 Claims, 4 Drawing Sheets

REMOVABLE HARD DISK MODULE

FIELD OF THE INVENTION

The present invention relates to a removable module, and more particularly, to a removable hard disk module having a sliding device with a shock absorption function.

BACKGROUND OF THE INVENTION

Information technology and the computer industry are highly developed now. People rely heavily on computer systems. Therefore, computer servers with high calculation capacity and high stability are important for computer systems. Due to increasingly reduced office space, area occupied by computer servers must also be reduced. Computer servers must maintain a high degree of stability to serve users, and the space occupied by one computer server is therefore greater than or equal to that of a desktop computer. The management of computer servers is difficult and space utilization is tightened. Some normal companies have 2 or 3 computer servers, while others may have more than a thousand computer servers. Computer server management and space utilization become more critical in companies with more computer servers.

A 1U computer server assembled on a standard 1U server rack is the mainstream computer server arrangement. Each standard layer of the rack is about 1.75 inches (about 4.5 centimeters), so that the 1U server and the rack effectively conserve occupational space of the computer servers. Moreover, the 1U servers and racks are more efficiently controlled because the 1U servers and racks can be centrally managed and easily stacked. Normally, hardware used in the 1U server is provided with a smaller size and lower height to fit the thickness limitation of 1.75 inches. A server system is convenient for a user seeking or storing data because the server rack usually provides numerous hard disks to store data therein. Especially, the hard disks on the server racks are convenient to data exchange, repair and installation because each hard disk is installed in a removable module and the removable module is installed in the server rack.

The dimensions of the server rack and the dimension of the removable module limit the quantity of conventional removable hard disk modules which can be installed in one server rack. That is to say, due to the width and height limitation, some residual space of the server rack cannot be utilized to install the hard disk. Generally, the horizontal width of the server rack is wider than the total horizontal width of four horizontal hard disks. However, for firmly installing the hard disk in the removable module and on the server rack to pass environmental tests, e.g. drop test, vibration test, and shock test, to ensure the quality and life span of the server system, a sliding mechanism of a conventional removable module is coupled to a corresponding sliding mechanism of a fixing device fixed in the server rack. The corresponding sliding mechanism and the sliding mechanisms are usually disposed on the top surface and the bottom surface of the fixing module and the removable module respectively to provide suitable fixing and shock absorption for the hard disk and the removable module.

However, the horizontal residual space of the server rack is useless when the sliding mechanism is disposed on the top surface and the bottom surface of the removable module. Further, the thickness of the removable module is increased so that the total quantity of the hard disks and the removable module, which can be installed in the server rack, is reduced in thickness direction.

However, if the sliding mechanisms are disposed on sidewalls of the removable module, the quantity of the hard disk and the removable module installable in the server rack is about only three in the horizontal width direction. Therefore, the space of the server rack is wasted, especially for the horizontal width direction.

Hence, the conventional removable modules installed in the server rack cannot fully utilize the space of the server rack. Some space of the server rack is wasted, and the office space occupied by computer servers is therefore increased.

SUMMARY OF THE INVENTION

It is an object of the present invention to provide a removable hard disk module which can utilize the residual space of the server rack in the horizontal width direction to couple with the server rack.

It is another object of the present invention to provide a removable hard disk module which can absorb shock and vibration to increase the reliability and life span of the removable hard disk and a hard disk therein.

It is further another object of the present invention to provide a removable hard disk module with a reduced volume so as to increase the quantity of hard disks installed in the server rack.

To accomplish the above objectives, the present invention provides a removable hard disk module. The removable hard disk module has a module sidewall, a first sliding device, and a second sliding device. The first sliding device and the second sliding device are fixed on the module sidewall. The first sliding device further includes a buffer device therein. The second sliding device is fixed behind the first sliding device. Furthermore, the first sliding device and the second sliding device support the removable hard disk module so that the removable hard disk module is efficiently installed and can slide in the module fixing device.

The module fixing device further has a supporting wall and the supporting wall further has a slim slide thereon to couple to the first sliding device and the second sliding device for supporting the removable hard disk module. Therefore, the removable hard disk module can slide and be installed in the module fixing device. The slim slide further has a slim slide buffer device for coupling to the second sliding device.

The removable hard disk module further includes a handle with a push block at the front portion thereof to allow convenient installation and removal of the removable hard disk module. When the handle is open, the push block pushes the slim slide so as to release conveniently the removable hard disk module from the module fixing device.

The second sliding device is made of a metal pin or a high strength pin and the first sliding device further has a convex sliding surface for contact with the slim slide to reduce a shock force impacting on the removable hard disk module and the hard disk therein. The buffer device of the first sliding device is preferably a shock absorption rubber and is inserted in the first sliding device. The first sliding device and the second sliding device are about 1 mm thick.

Another aspect of the present invention is a movable module to fix an electrical device therein for convenient installation or removal in a server rack, and especially, a standard 1U server rack. Four removable module can be horizontally arranged in the standard 1U server rack to use efficiently the space of the server rack.

Hence, the removable module can provide sufficient protection for the electrical device therein. Therefore, the reliability and life span of the electrical device can be enhanced.

The removal and installation speed, and the installation quantity can be increased. Furthermore, the data storage capability of the server with the removable hard disk module can be efficiently increased.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
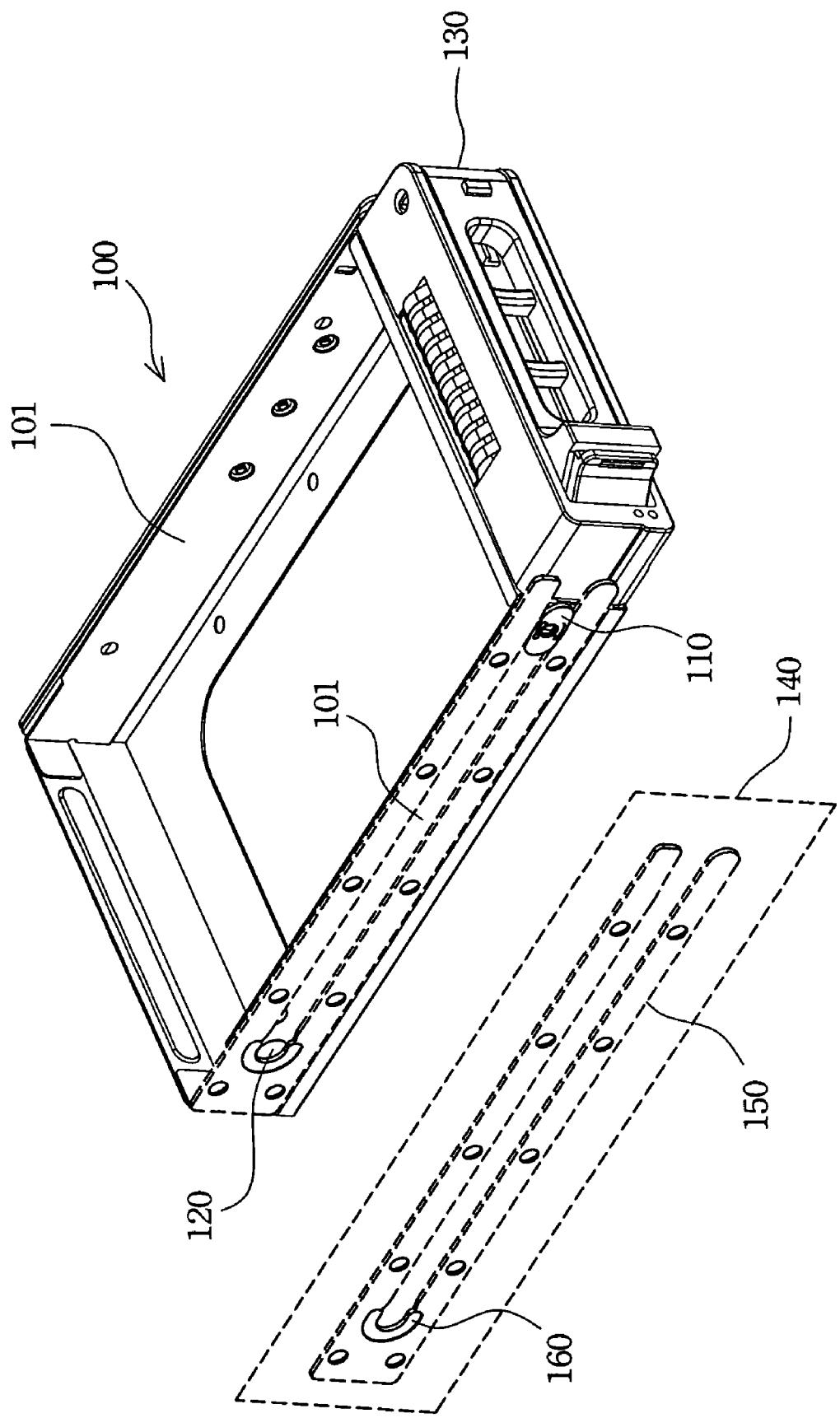
FIG. 1 is a preferred embodiment of the removable hard disk module according to the present invention.

FIG. 1 is a preferred embodiment of the removable hard disk module according to the present invention. The removable hard disk module 100 is utilized to install a hard disk therein. A module sidewall 101 of the removable hard disk module 100 includes a first sliding device 110 and a second sliding device 120 to enable the removable hard disk module 100 to slide in a module fixing device.

In the preferred embodiment, the module fixing device set on a server includes a supporting wall 140 (as the dashed line shown) with a slim slide 150 to support the removable hard disk module 100. The removable hard disk module 100 utilizes a first sliding device 110 and a second sliding device 120 to slide on the slim slide 150 so that the removable hard disk module 100 can slide along the supporting wall 140 of the module fixing device. Referring to the dashed line portion of the drawing, the supporting wall 140 and the slim slide 150 thereon are configured at and cooperate with one side of the removable hard disk module 100. The first sliding device 110 is a shock absorption device made of a plastic material, e.g. POM(Polyoxymethylene) or ABS(Acrylonitrile-Butadiene-Styrene), to provide a supporting force for the removable hard disk module 100 installed on the supporting wall 140 of the module fixing device and to enable the removable hard disk module to slide on the slim slide 150.

The second sliding device 120 is a high strength pin made of a metal material or any other high strength material. For enhancing the shock absorption effect for the removable hard disk module 100 to protect the removable hard disk module 100 and the hard disk therein, the end portion of the slim slide 150 further includes a buffer device 160 to absorb the shock force so as to reduce the shock force attacking on the removable hard disk module 100 and the hard disk. The buffer device 160 is preferably made of a shock absorption rubber.

Figure 2:
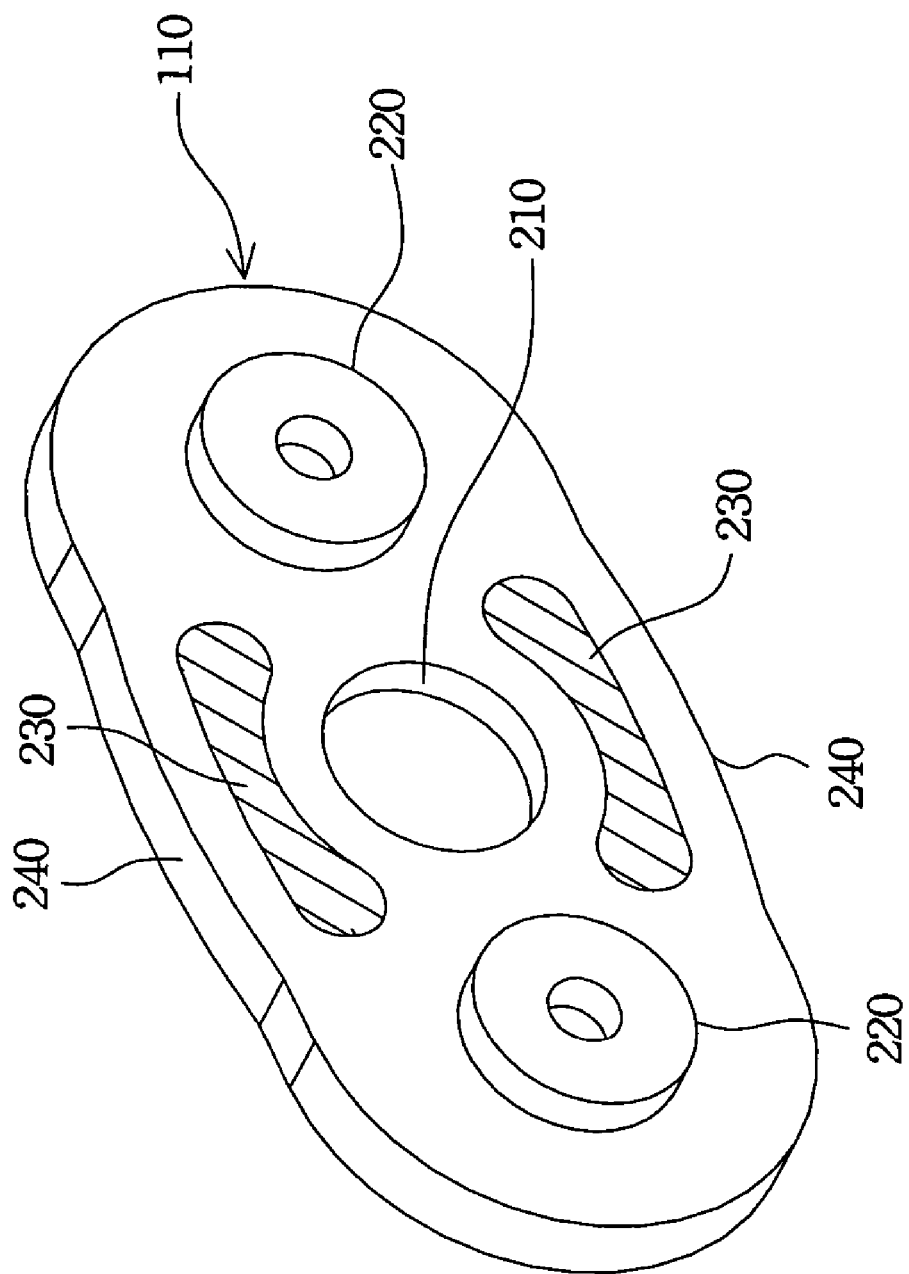
FIG. 2 is a schematic view of a first sliding device of the preferred embodiment of FIG. 1.

FIG. 2 is a schematic view of a first sliding device of the preferred embodiment of FIG. 1. The first sliding device 110 provides not only a capability for the removable hard disk module 100 to slide on the slim slide 150 but also a shock protection for the removable hard disk module 100 and the hard disk. The first sliding device 110 has a fixing hole 210, at least one fixing flange 220, at least one buffer device 230, and at least one sliding surface 240 for coupling to the slim slide 150. The fixing hole 210 is utilized to fix the first sliding device 110 on the module sidewall 101 and the fixing flange 220 is auxiliary to fix the first sliding device 110. When the first sliding device 110 is fixed on the module sidewall 101, the fixing flange 220 is first inserted in a corresponding hole on the module sidewall 101 and then a fixing device is utilized to fix the first sliding device on the module sidewall 101.

The sliding surface 240 is a convex sliding surface to reduce the sliding resistance of the first sliding device 110 sliding on the slim slide 150 and also provide a shock absorption capability. The first sliding device 110 further includes at least one buffer device 230 therein to enhance the shock absorption capability so that the removable hard disk module 100 and the hard disk therein can be protected from the shock force to enhance the reliability and the life span thereof. Therefore, the removable hard disk module 100 according to the present invention can pass the shock test and the vibration test to provide protection for the removable hard disk module 100 and the hard disk.

Because the first sliding device 110, the second sliding device 120, and the slim slide 150 are very thin, about only one mm thick. Therefore, four removable hard disk modules 100 according to the present invention can be installed in one standard 1U server rack in a horizontal width direction. The residual space of the server rack is fully used in the horizontal width direction. Furthermore, a top surface and a bottom surface of the removable hard disk module 100 are saved. Therefore, three layers of the removable hard disk modules 100 can be installed in two standard 1U server racks in an elevation thickness direction. That is to say, a standard 2U server rack can install twelve hard disks and twelve corresponding removable hard disk modules 100 totally. The removable hard disk module 100 not only provides the supporting force for the hard disk but also utilizes the sliding device providing shock absorption to protect the removable hard disk module 100 and the hard disk therein from the damage of shock force so as to improve the reliability and the life span thereof. The removable hard disk module 100 further includes a handle 130 at the front portion thereof for convenient removal and installation of the removable hard disk module 100.

Figure 3:
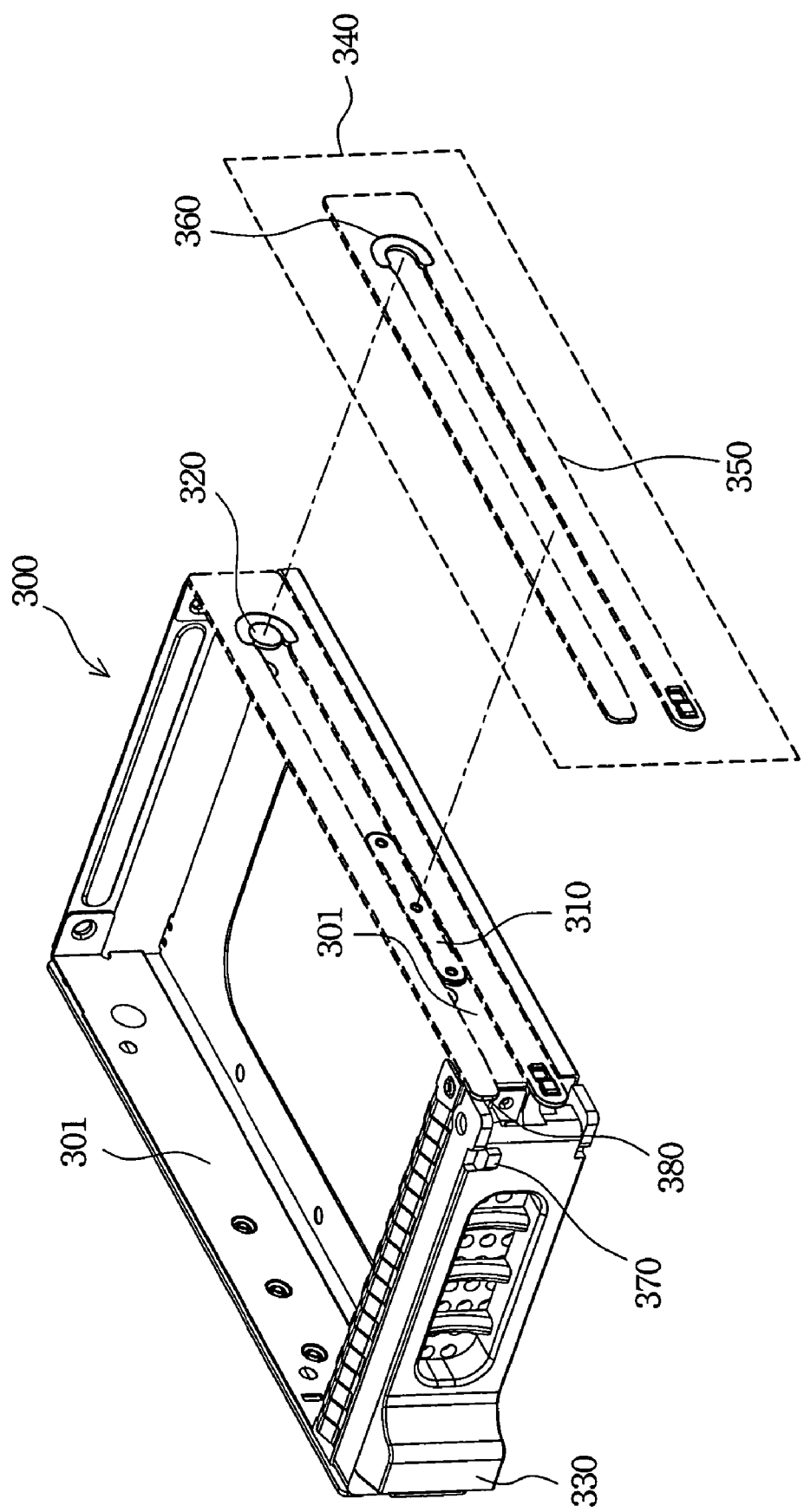
FIG. 3 is another preferred embodiment of the removable hard disk module according to the present invention.

FIG. 3 is another preferred embodiment of the removable hard disk module according to the present invention. The removable hard disk module 300 is utilized to install a hard disk therein. A module sidewall 301 of the removable hard disk module 300 includes a first sliding device 310 and a second sliding device 320 to enable the removable hard disk module 100 to slide in a module fixing device.

The module fixing device also includes a supporting wall 340 (as indicated by the dashed line) with a slim slide 350 to support the removable hard disk module 300. The removable hard disk module 300 further utilizes a first sliding device 310 and a second sliding device 320 to slide on the slim slide 350 so that the removable hard disk module 300 can slide on the slim slide 350.

Referring to the dashed line portion of the drawing, the supporting wall 340 and the slim slide 350 thereon are configured at and cooperate with one side of the removable hard disk module 300. The first sliding device 310 is a shock absorption device made of a sheet metal or a plastic material to provide a supporting force for the removable hard disk module 300 installed on the supporting wall 340 of the module fixing device and to enable the removable hard disk module 300 sliding on the slim slide 350.

The second sliding device 320 is a high strength pin made of a metal material or any other high strength material. For enhancing the shock absorption effect for the removable hard disk module 300 to protect the removable hard disk module 300 and the hard disk therein, the end portion of the slim slide 350 further includes a buffer device 360 to absorb the shock force so as to reduce the shock force attacking on the removable hard disk module 300 and the hard disk. The buffer device 360 is preferably made of a shock absorption rubber.

Figure 4:
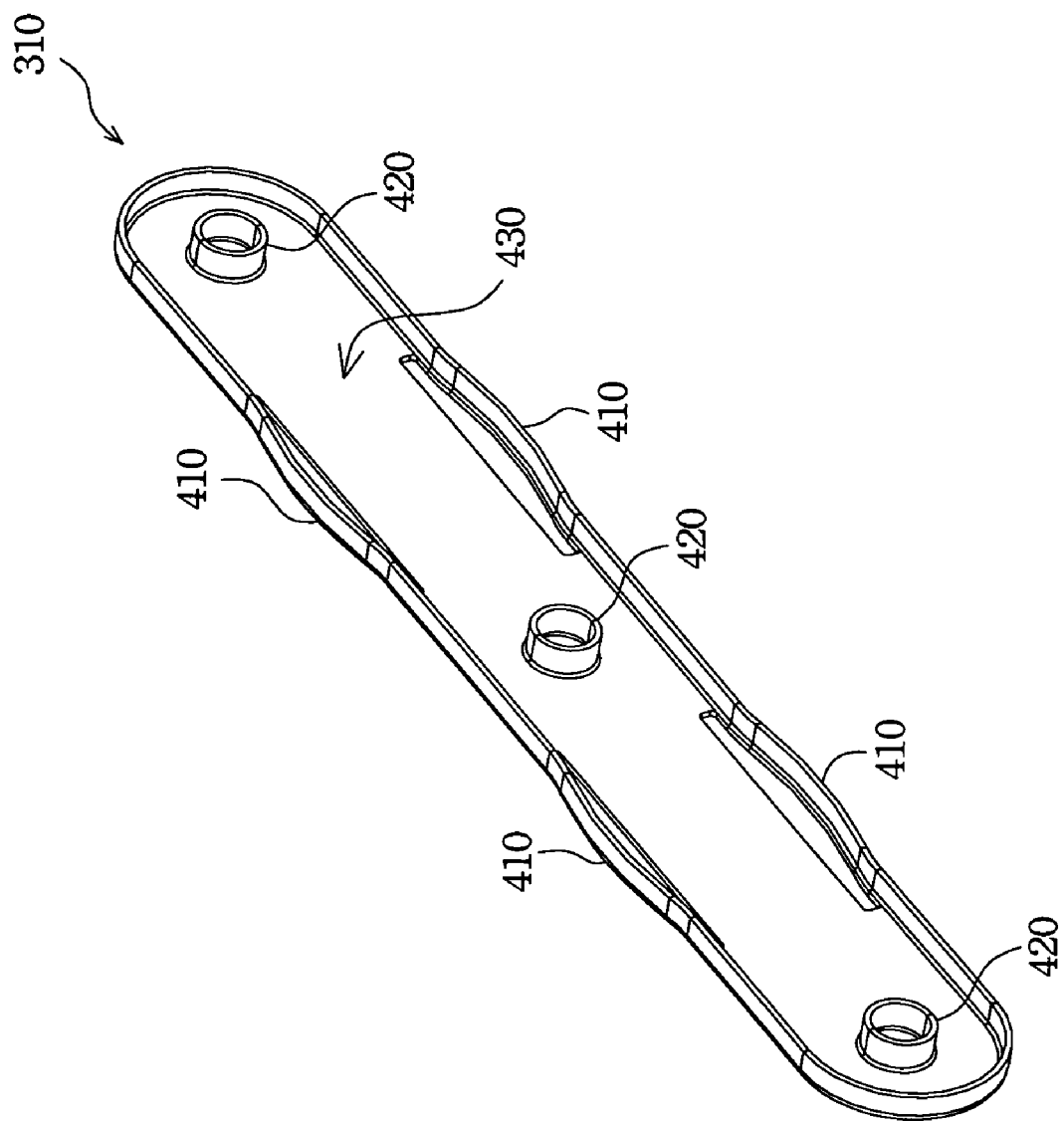
FIG. 4 is a schematic view of a first sliding device of the another preferred embodiment of FIG. 2.

FIG. 4 is a schematic view of a first sliding device of the preferred embodiment of FIG. 3. The first sliding device 310 not only allows the removable hard disk module 300 to slide on the slim slide 350 but also provides shock protection for the removable hard disk module 300 and the hard disk. The first sliding device 310 has at least one fixing hole 420 for fixing the first sliding device 310 on the module sidewall 301 and at least one sliding surface 410 for sliding coupling the slim slide 350.

The sliding surface 410 is a convex sliding surface to reduce the sliding resistance of the first sliding device 310 sliding on the slim slide 350 and also to provide shock absorption. An inner portion 430, close to the module sidewall 301, of the first sliding device 310 further includes a installed buffer material installed therein for enhancing the shock absorption capability so that the removable hard disk module 300 and the hard disk therein can be protected from shock and the reliability and the life span thereof are enhanced. Therefore, the removable hard disk module 300 according to the present invention can pass the shock test and the vibration test to provide enough protection for the removable hard disk module 300 and the hard disk.

Because the first sliding device 310, the second sliding device 320, and the slim slide 350 are very thin, about only one mm thick, four removable hard disk modules 300 according to the present invention can be installed in one standard 1U server rack in a horizontal width direction. The residual space of the server rack is fully used in the horizontal width direction. Furthermore, a top surface and a bottom surface of the removable hard disk module 300 are saved. Therefore, three removable hard disk modules 300 can be installed in two standard 1U server racks in the thickness direction. That is to say, twelve hard disks and twelve corresponding removable hard disk modules 300 can be installed in a standard 2U server rack. The removable hard disk modules 300 not only provide the supporting force of the hard disk but also utilize the sliding device providing buffer function to protect the removable hard disk modules 300 and the hard disk therein from shock force damage so as to improve the reliability and the life span of thereof.

The removable hard disk module 300 further includes a handle 330 at the front portion thereof for convenient removal and installation of the removable hard disk module 300. The handle 330 further includes a push block 370 close to a shaft of the handle 330. When the handle 330 is open, the push block 370 can push a push surface 380 at the front portion of the slim slide 350 to withdraw the removable hard disk module 300 from the module fixing device so that the removable hard disk module 300 can be further convenient to removal and installation.

The removable hard disk module utilizes sliding devices with capabilities of elasticity and shock absorption on two sides of the removable hard disk module to support and protect the removable hard disk module and the hard disk therein. Furthermore, the sliding devices and the corresponding slim slide are all thin dimension elements so that the quantity of hard disk installed in the server rack can be efficiently increased. Therefore, the server with the removable hard disk module according to the present invention can provide more data storage volume, and also provide a quick withdraw function to enhance the speed of the installation, removal, and exchange of the hard disks. Hence, the removable hard disk module according to the present invention can enhance server management efficiency. Furthermore, the removable hard disk module according to the present invention fully utilizes the space of the server rack in the horizontal and vertical directions and therefore the sliding devices can be utilizes in any limited space apparatus for optimal space utilization.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A removable hard disk module installed in a module fixing device, the removable hard disk module comprising:
   a module sidewall;
   a first sliding device fixed on the module sidewall, wherein the first sliding device further comprises a buffer device therein; and
   a second sliding device fixed on the module sidewall and behind the first sliding device, wherein the first sliding device and the second sliding device support the removable hard disk module so that the removable hard disk module slides in the module fixing device,
   wherein the module fixing device further comprises a supporting wall with a slim slide to support the removable hard disk module so that the removable hard disk module slides in the module fixing device, and wherein the slim slide further comprises a slim slide buffer device to couple to the second sliding device.

2. The removable hard disk module of claim 1, wherein the first sliding device is a shock absorption device made of a plastic material.

3. The removable hard disk module of claim 2, wherein the plastic material is POM or ABS.

4. The removable hard disk module of claim 1, wherein the second sliding device is made of a metal pin or a high strength pin.

5. The removable hard disk module of claim 1, wherein the removable hard disk module further comprises a handle at a front portion thereof for convenient installation or removal of the removable hard disk module.

6. The removable hard disk module of claim 5, wherein the handle further comprises a push block to push the slim slide so as to release conveniently the removable hard disk module from the module fixing device when the handle is open.

7. The removable hard disk module of claim 1, wherein the first sliding device further comprises a convex sliding surface for contact with the slim slide.

8. The removable hard disk module of claim 1, wherein the buffer device is made of a shock absorption rubber.

9. The removable hard disk module of claim 1, wherein the first sliding device and the second sliding device are about 1 mm thick.

10. A removable apparatus utilized in a server rack for installing an electrical device in the server rack, the removable apparatus comprising:
- a removable module for fixing the electrical device therein, wherein the removable module further comprises:
  - a module sidewall;
  - a first sliding device fixed on the module sidewall, wherein the first sliding device further comprises a buffer device therein; and
  - a second sliding device fixed on the module sidewall and behind the first sliding device, wherein the first sliding device and the second sliding device support the removable hard disk module and the removable hard disk module slides in the module fixing device; and
- a module fixing device, wherein the module fixing device further comprises:
  - a supporting wall; and
  - a slim slide fixed on the supporting wall to couple to the first sliding device and the second sliding device of the removable module, wherein the removable module is installed and slides in the module fixing device, and the slim slide further comprises a slim slide buffer device to couple to the second sliding device.

11. The removable apparatus of claim 10, wherein the first sliding device further comprises a convex sliding surface for contact with the slim slide.

12. The removable apparatus of claim 10, wherein the first sliding device is a shock absorption device made of a plastic material.

13. The removable apparatus of claim 10, wherein the plastic material is POM or ABS.

14. The removable apparatus of claim 10, wherein the second sliding device is made of a metal pin or a high strength pin.

15. The removable apparatus of claim 10, wherein the buffer device is made of a shock absorption rubber.

16. The removable apparatus of claim 10, wherein the first sliding device and the second sliding device are about 1 mm thick.

17. The removable apparatus of claim 10, wherein the server rack is a 1U server rack and four of the removable apparatuses are configured in the 1U rack in a horizontal width direction.

* * * * *